United States Patent [19]

Chambers

[11] Patent Number: 4,535,651

[45] Date of Patent: Aug. 20, 1985

[54] TORQUE PROPORTIONING DIFFERENTIAL

[75] Inventor: Robert O. Chambers, Peoria, Ill.

[73] Assignee: Caterpillar Tractor Co., Peoria, Ill.

[21] Appl. No.: 645,480

[22] PCT Filed: Aug. 13, 1982

[86] PCT No.: PCT/US82/01103

§ 371 Date: Aug. 13, 1982

§ 102(e) Date: Aug. 13, 1982

[51] Int. Cl.³ .............................................. F16H 1/44
[52] U.S. Cl. ........................................ 74/711; 74/713; 74/714
[58] Field of Search ...................... 74/710, 710.5, 711, 74/713, 714, 650

[56] References Cited

U.S. PATENT DOCUMENTS

| | | | |
|---|---|---|---|
| 807,771 | 12/1905 | Pleukharp | 74/714 |
| 846,754 | 3/1907 | McClintock | 74/713 X |
| 1,033,083 | 7/1912 | Collins | 74/713 X |
| 1,165,915 | 12/1915 | Sparks | 74/713 X |
| 1,224,124 | 5/1917 | Adler | 74/650 |
| 1,358,788 | 11/1920 | Ross | 74/714 |
| 1,362,076 | 12/1920 | Blom | 74/713 X |
| 1,424,118 | 7/1922 | Ramer | 74/710 X |
| 2,545,601 | 3/1951 | Brubaker | 74/711 |
| 2,667,087 | 1/1954 | Myers | 74/650 |
| 2,667,088 | 1/1954 | Myers | 74/650 |
| 2,830,466 | 4/1958 | Myers | 74/650 |
| 2,949,792 | 8/1960 | Smith | 74/711 |
| 3,292,456 | 12/1966 | Saari | 74/711 |
| 3,340,748 | 9/1967 | Young | 74/711 X |
| 3,344,688 | 10/1967 | Frost | 74/711 |
| 3,895,546 | 7/1975 | Yamaguchi et al. | 74/710.5 |
| 3,899,938 | 8/1975 | Crabb | 74/714 X |
| 3,915,031 | 10/1975 | Hanson | 74/714 X |
| 4,041,804 | 8/1977 | Clark | 74/711 |
| 4,074,591 | 2/1978 | Dick | 74/714 |
| 4,280,583 | 7/1981 | Sfieg | 74/711 X |
| 4,400,996 | 8/1983 | Schou | 74/711 X |

FOREIGN PATENT DOCUMENTS

| | | | |
|---|---|---|---|
| 700272 | 12/1940 | Fed. Rep. of Germany | 74/711 |
| 2034831 | 6/1980 | United Kingdom | 74/710.5 |
| 238303 | 7/1969 | U.S.S.R. | 74/713 |
| 579480 | 11/1977 | U.S.S.R. | 74/714 |

*Primary Examiner*—Leslie A. Braun
*Assistant Examiner*—Dwight G. Diehl
*Attorney, Agent, or Firm*—Charles E. Lanchantin, Jr.

[57] ABSTRACT

A torque proportioning differential (10/110) is disclosed for a wheeled vehicle or the like which has a driven carrier (18/112), first and second output members (68,72/138,140), first and second radially outer gears (44,48/122,124), first and second radially inner gears (56,58/126,128), a gear mechanism (26,28/116,118) rotatably mounted on the carrier for cross connecting the outer and inner gears, and first and second coupling devices (78,80/130,134,142,144) for delivering more than 50% and less than 100% of the input torque to the slower output member, with the coupling devices being connected to the output members and at least one of each of the outer and inner gears. Positive drive of each output member is achieved in each direction of rotation of the carrier without a significant degree of energy dissipation.

40 Claims, 15 Drawing Figures

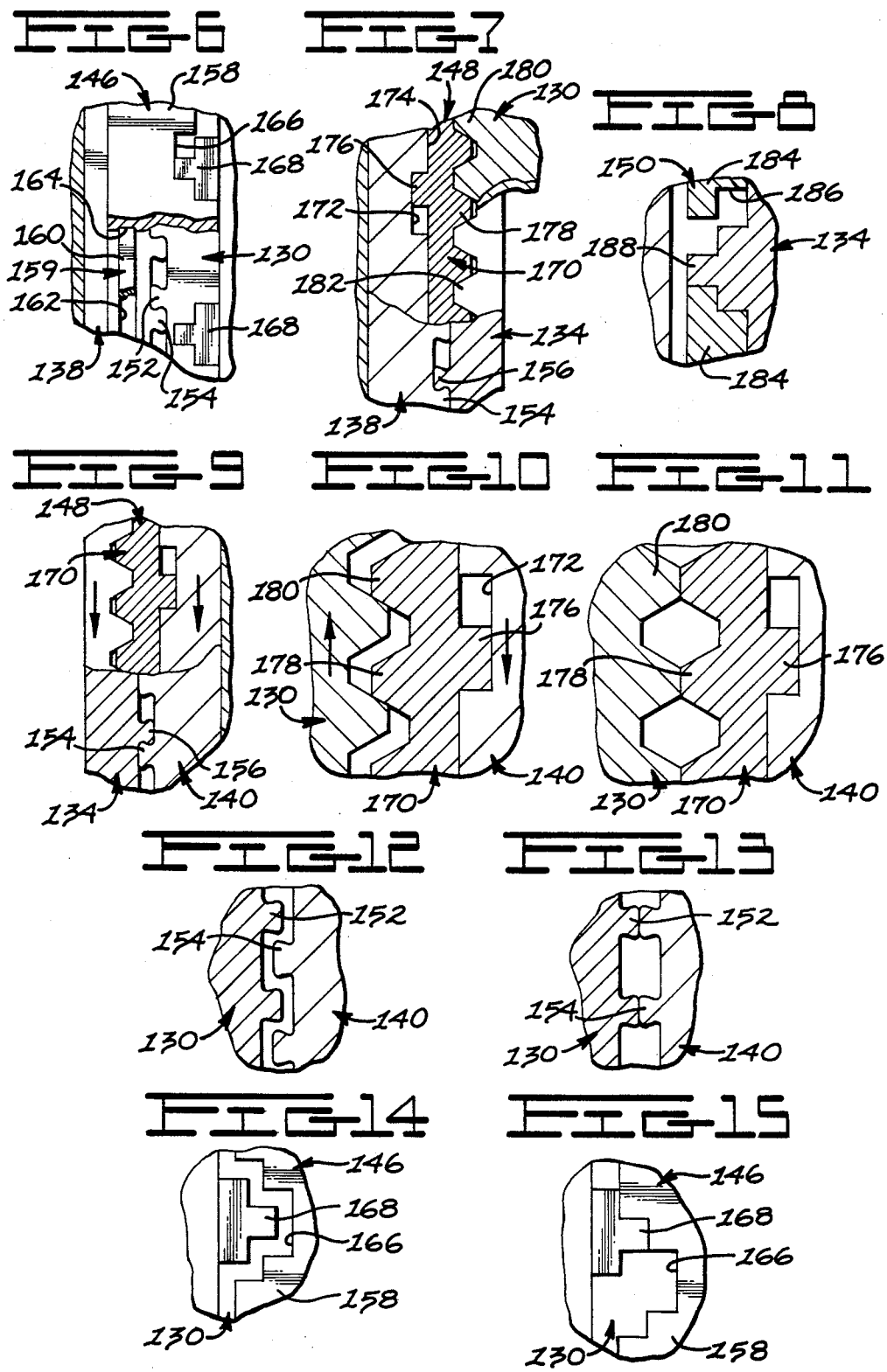

TORQUE PROPORTIONING DIFFERENTIAL

TECHNICAL FIELD

This invention relates generally to a torque proportioning differential for a wheeled vehicle or the like, and particularly to a differential that will deliver a preselected ratio more than 50% and less than 100% of the total torque to the slower output member.

BACKGROUND ART

While conventional differentials deliver half of the input torque to each wheel, the well known Detroit No SPIN differential has the characteristic of allowing one of its output members to freewheel and the other to receive and to deliver all of the input torque. This is undesirable from the standpoint that every member of the drive train between the differential output members and the ground-engaging wheels must be designed to withstand 100% of the total torque. Moreover, there is considerable resistance to steering during a turn. The Detroit No SPIN differential acts like a pair of overrunning clutches, but differs from other overrunning clutches in that the direction of overrunning reverses when the device is driven in the opposite direction.

Some differentials employ energy dissipation devices for delivering more than 50% and less than 100% of the total torque to the non-slipping wheel or to the slower inside wheel during a turn to overcome the aforementioned problems. However, these devices by their very nature lack durability because of internal damage caused by dissipated energy in the form of frictionally generated heat.

The present invention is directed to overcoming one or more of the problems as set forth above.

DISCLOSURE OF THE INVENTION

In one aspect of the invention a torque proportioning differential includes a driven carrier rotatable about an axis, first and second output members extending along the axis, first and second radially outer gears, first and second radially inner gears, gear means rotatably connected to the carrier for crossconnecting the outer and inner gears, and disengageable coupling means for delivering more than 50% and less than 100% of the total torque to the first output member when the second output member exhibits a relative speed increase, with the coupling means being connected to the output members and at least one of each of the outer and inner gears.

In another aspect of the invention a differential is provided having a driven carrier, left and right output members, left and right ring gears, left and right sun gears, left and right compound planet gear sets cross connected between the ring gears and the sun gears, and left and right sleeve coupling means for connecting the respective ring gear and sun gear to the respective output member and being disengageable for delivering more than 50% and less than 100% of the total input torque to the slower rotating output member.

In a still further aspect of the invention a differential is provided having a driven carrier, left and right output members, left and right outer bevel gears, left and right inner bevel gears, a plurality of sets of interconnected outer and inner pinion gears cross connecting the outer and inner bevel gears, and left and right coupling means for connecting the respective outer and inner bevel gear to the respective output member and being disengageable for delivering more than 50% and less than 100% of the total input torque to the slower rotating output member.

Two embodiments of the torque proportioning differential of the present invention are disclosed, with each continually assuring the positive transmission of driving torque to both of the output members or axle shafts in either direction of rotation of the driven carrier, and without internal power dissipation of the type associated with friction clutches, internal pumps or the like.

BRIEF DESCRIPTION OF THE DRAWINGS

FIG. 6 is an enlarged and diagrammatic plan view taken along line VI—VI of FIG. 5 with a portion broken away to better show details thereof;

FIG. 7 is an enlarged and diagrammatic sectionalized view taken along line VII—VII of FIG. 5 with portions broken away to better illustrate details of the differential;

FIG. 8 is an enlarged and diagrammatic sectionalized view, taken along line VIII—VIII of FIG. 5;

FIG. 9 is a sectionalized view somewhat like FIG. 7 only illustrating the coupling means on the opposite or right side of the differential;

FIG. 10 is a view somewhat like FIG. 9 only being enlarged and illustrating an intermediate disconnect position of the coupling means;

FIG. 11 is a view like FIG. 10 only illustrating a disengaged position of the coupling means;

FIG. 12 is a view showing another portion of the right side coupling means in a position operationally corresponding to FIG. 10;

FIG. 13 is a view like FIG. 12 only illustrating a disengaged position thereof operationally corresponding to FIG. 11;

FIG. 14 is a plan view similar to a portion of FIG. 6, only taken on the opposite or right side of the differential and showing an intermediate position of certain elements thereof; and FIG. 15, is a view like FIG. 14 only showing a blocking position thereof.

BEST MODE FOR CARRYING OUT THE INVENTION

Figure 1:
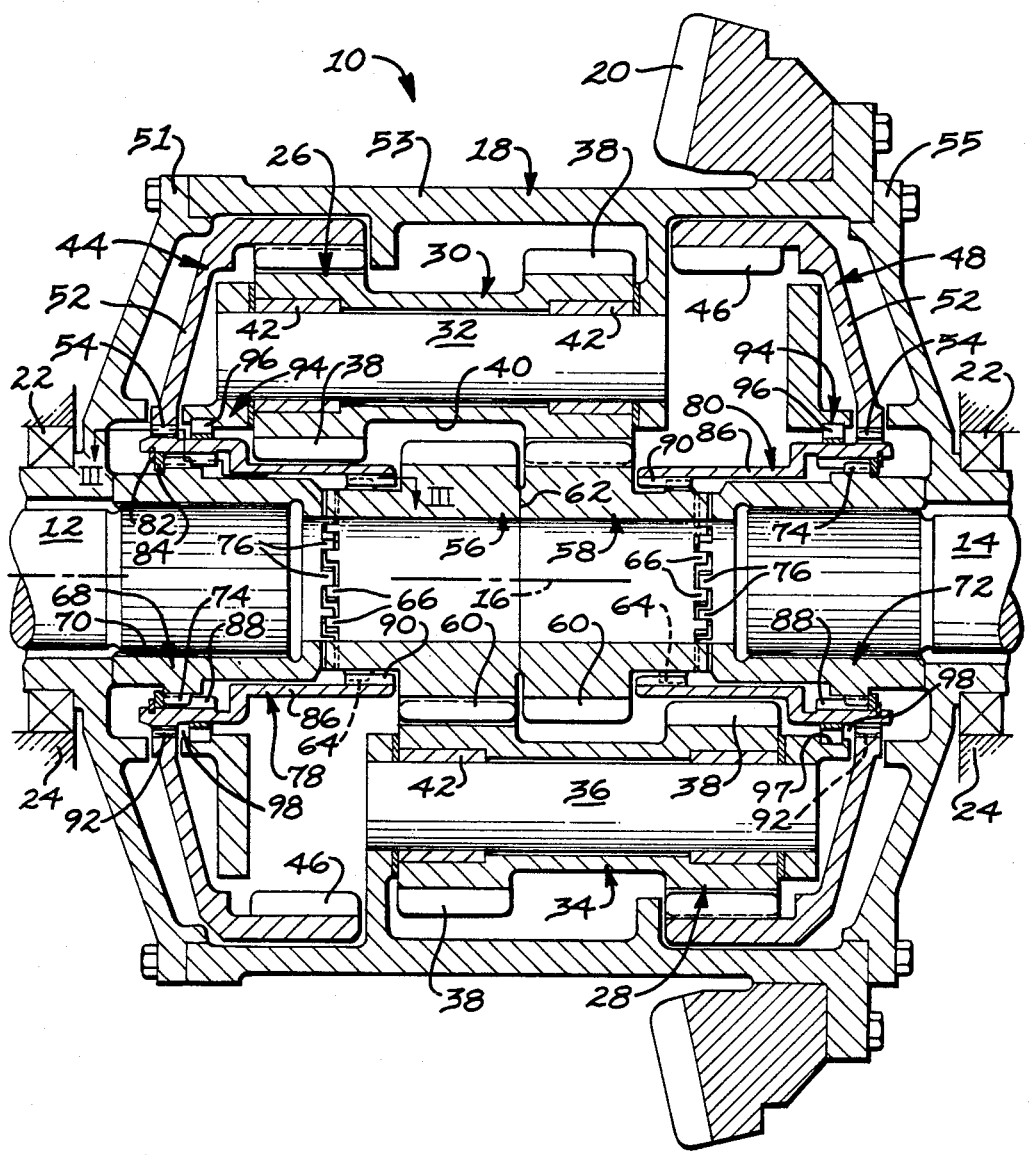
FIG. 1 is a diagrammatic sectionalized view of one embodiment of a torque proportioning differential constructed in accordance with the present invention.

FIG. 1 illustrates a torque proportioning differential 10 constructed in accordance with one embodiment of the present invention, and which is particularly useful for an earthmoving wheeled vehicle or the like. Although the wheels are not shown, it is to be understood that they can be of the non-dirigible type, with steering being achieved by other conventional means. The wheels are driven by left and right output shafts 12,14 when viewing the drawing, which shafts are substantially aligned along a central axis 16 transverse to the usual direction of longitudinal travel of the vehicle. The wheels can be driven directly by the output shafts or through additional gearing such as a planetary final drive of the usual type, not shown.

The differential 10 includes a three-piece input housing or annular planet carrier 18 which is rotated by an engine and transmission driven bevel gear 20 releasably secured to the carrier. A pair of bearing assemblies 22 are respectively secured in a pair of stationary axle housing walls 24 for rotatably supporting the planet carrier on the axis 16. The planet carrier 18 supports interconnected first and second planet gear sets or gear mechanisms 26 and 28 on the left and right sides of the differential when viewing the drawing. The left set preferably includes three equally circumferentially spaced planet gears 30 which are individually mounted for rotation with respect to the carrier of planet shafts 32. The right set similarly includes three planet gears 34, with each mounted on a respective shaft 36. Each of the planet gears 30,34 is of identical compound construction and has spaced apart gear teeth 38 on the opposite ends thereof, a centrally disposed cylindrical sleeve portion 40 of reduced diameter, and a pair of axially spaced bearings 42 for rotatably supporting it on the respective shaft.

A first radially outer gear or left ring gear 44 having a plurality of gear teeth 46 is in intermeshing engagement with the left gear teeth 38 of the left planet gears 30, and a second radially outer gear or right ring gear 48 has a plurality of similar teeth 46 which are similarly meshed with the right gear teeth 38 of the right planet gears 34. The left and right ring gears are identical and individually have a radially inner annular hub 52 with a plurality of axially aligned, inner coupling teeth 54. As can be seen from FIG. 1, the hub of each ring gear is axially entrapped by separable members 51,53 and 55 of the three-piece carrier 18. Thus the ring gears are both radially and axially supported within the differential 10.

A first radially inner gear or left sun gear 56 and a second radially inner gear or right sun gear 58 having identical sun gear teeth 60 are juxtaposed centrally of the differential 10 and have facing end surfaces 62 which serve to limit the axial inward movement thereof. On the one hand, the left sun gear teeth 60 are intermeshingly engaged with the left gear teeth 38 of the right planet gears 34, while the right sun gear teeth 60 are engaged with the right gear teeth 38 of the left planet gears 30. Thus, the sun gears are radially supported on the central axis 16 by the planet gears. Each sun gear defines a plurality of two-way, radially extending, helical coupling teeth 64 on the axially outside peripheral surface thereof and a plurality of axially extending and straight coupling teeth 66 formed on the axially outer end faces thereof, the purposes of which will be later explained.

A left output member 68 is releasably connected to the left output shaft 12 as by splines 70, and a right output member 72 is similarly connected to the right output shaft 14 in a mirror image manner. Each of the output members 68,72 defines a plurality of two-way, radially extending helical coupling teeth 74 formed on the peripheral surface thereof and a plurality of axially extending and straight coupling teeth 76 formed on the axially inner end faces thereof. As can be representatively noted from viewing FIGS. 1 and 3, the teeth 76 of the output members 68,72 intermesh or cooperate with the teeth 66 of the sun gears 56,58 with a preselected degree of angular lost motion or free play.

Advantageously, left disengageable sleeve coupling means or a left coupling device 78 are provided in the differential 10 for selectively connecting the left ring gear 44 to the left sun gear 56 and the left output member 68 or to disconnect the left ring gear therefrom. Similarly, right disengageable sleeve coupling means or a right coupling device 80 are provided for automatically connecting the right ring gear 48 to the right sun gear 58 and the right output member 72 or to disconnect the right ring gear therefrom. In the illustration of FIG. 1, the sleeve coupling means 78 and 80 are disposed in the normally connected mode of operation so as to apportion equal levels of torque to both of the output shafts 12 and 14 through dual power paths. As may be noted from FIG. 2, however, the right sleeve coupling means 80 is shown as being disconnected from the right ring gear 48 such as would be the case with a slipping right wheel, so as to deliver more than 50% and less than 100% of the total torque to the left output member 68 through a single power path for both sides. Thus the coupling means 78,80 individually serve as overrunning clutch mechanisms.

The left and right sleeve coupling means 78,80 are substantially mirror images of each other so that a description of one will suffice for the other. In the instant embodiment the left sleeve coupling means 78 includes a pair of generally annular and disconnectable retaining rings 82,84 of the usual type, and a stepped sleeve 86 defining first, second and third coupling teeth 88, 90 and 92. As can be better noted in FIG. 3, the first coupling teeth 88 are two-way, radially inwardly extending, helical coupling teeth that intermesh or cooperate with the coupling teeth 74 of the left output member 68 with a preselected degree of angular lost motion. The second coupling teeth 90 are likewise two-way, radially inwardly extending, helical coupling teeth that engage with the same degree of angular lost motion the coupling teeth 64 of the left sun gear 56. Lastly, the peripheral third coupling teeth 92 are straight teeth that are axially releasably coupled to the inner coupling teeth 54 of the ring gear 44.

Figure 2:
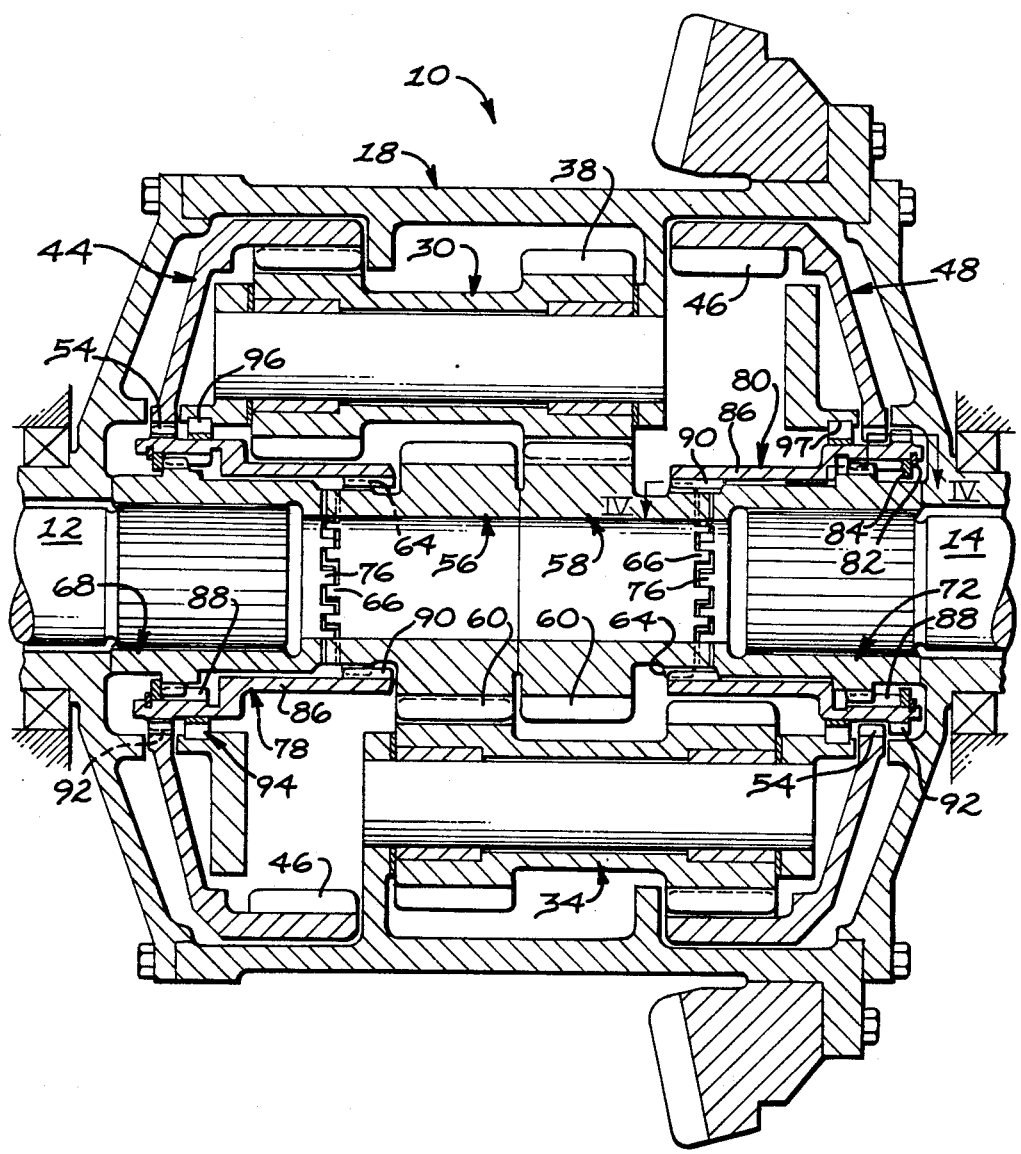
FIG. 2 is a view similar to FIG. 1 only showing the coupling at the right side of the torque proportioning differential disengaged in response to a speed increase of the right output member thereof.
Figure 4:
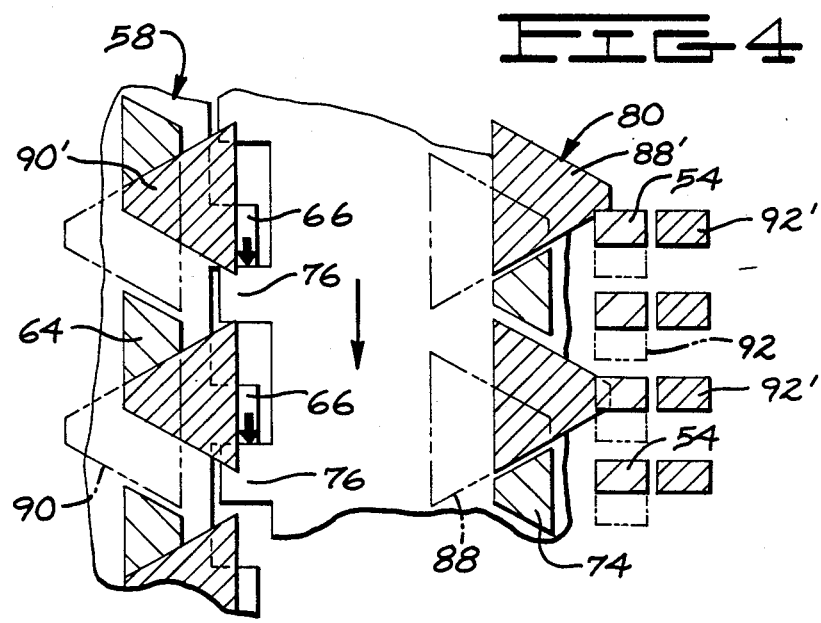
FIG. 4 is a greatly enlarged, diagrammatic and sectionalized plan view comparable to FIG. 3 only taken along stepped break line IV—IV of FIG. 2 on the opposite side of the differential.

Both the left and right sleeves 86 are axially movable automatically toward laterally outward positions of disengagement from the respective ring gears 44,48 and this can best be visualized by viewing FIGS. 2 and 4. Note that the right sleeve 86 is diagrammatically illustrated in its right-most position wherein the peripheral teeth 92 thereof are spaced axially outwardly beyond the teeth 54 of the right ring gear 48. In such mode of operation the right sun gear 58 transmits only about 30%, for example, of the total torque level to the slipping right output shaft 14 through the right output member 72 via the interengaged teeth 66,76. Simultaneously, the left ring gear 44 is still coupled to the left output shaft 12 to communicate about 70% of the total torque level to the slower wheel through the single power path of the left sleeve 86.

The differential 10 preferably includes drag means 94 for urging the individual coupling means 78,80 toward reengagement in response to the interaction of the coupling teeth 64, 90 and 74, 88 by applying a light rotational retarding force between the coupling means and the planet carrier 18. Specifically, the drag means can include an undulating or polygonal metallic strip 96 that is slightly resiliently compressed in an annular and generally cylindrically walled space 98 defined externally of each of the sleeves 86 and internally of the carrier member 53 at the spaced apart locations. Each of the resiliently deformed strips 96 can be axially trapped in a groove 97 in the planet carrier 18 as is illustrated, or alternatively each can be disposed in an axially trapping groove in the respective sleeve.

INDUSTRIAL APPLICABILITY

Considering now the torque proportioning differential 10 in a first mode of operation wherein it is functioning normally to deliver equal amounts of torque to the opposite wheels of the vehicle. Such straight-ahead mode is illustrated in FIG. 1, and it can be noted that the coupling sleeves 86 are both axially inwardly disposed in positions of engagement with the respective ring gears 44,48. As is representatively illustrated in FIG. 3, the left ring gear inner coupling teeth 54 are in driving engagement with the corresponding straight coupling teeth 92 as is indicated by the force arrow identified by the letter A. This is the situation when the planet carrier 18 is driven in a counterclockwise direction when viewing the differential of FIG. 1 from the right side along the central axis. Under these circumstances the ring gears 44,48 are driven in a counterclockwise direction and the sun gears 56,58 are driven in a counterclockwise direction. Hence the coupling teeth 66 of the left sun gear 56, for example, are disposed in driving engagement with the straight coupling teeth 76 of the left output member 68 as is indicated by the force arrow identified by the letter B. If the number of the teeth 46 in the ring gears is 63, and the number of teeth 60 in the sun gears is 27, then with this preselected ratio about 70% of the normal driving torque to one side of the vehicle is transmitted by the ring gear and the remaining 30% by the sun gear. The right side of the differential operates in the same mirror image manner as can be appreciated by viewing the drawings.

Figure 3:
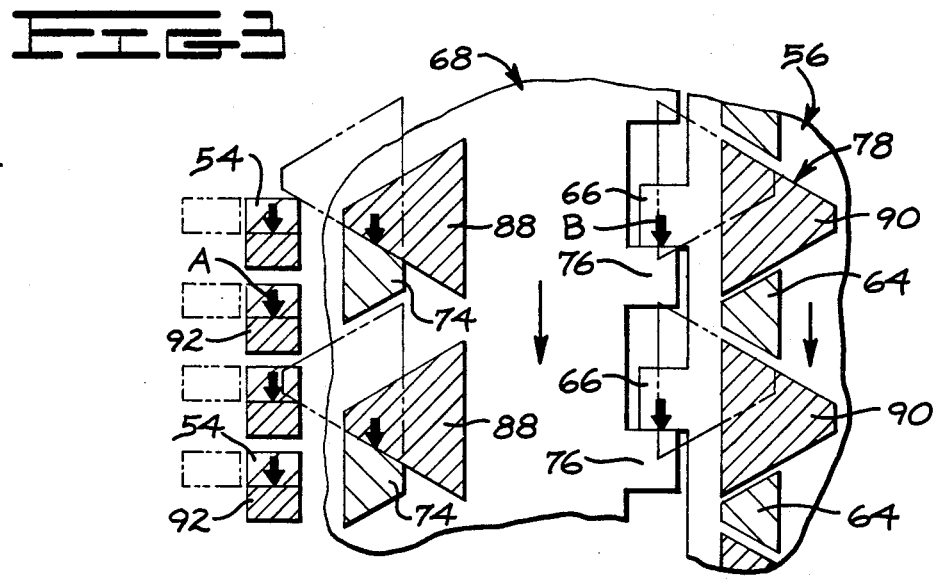
FIG. 3 is a greatly enlarged, diagrammatic, and developed sectionalized plan view taken along stepped break line III—III of FIG. 1 with portions axially offset for clarity.

In a second mode of operation one can assume, by way of example, that the right wheel of the vehicle is slipping because of adverse ground conditions. Then this will cause the speed of the right output shaft 14, the right output member 72, and the right sun gear 58 to increase relative to the planet carrier 18. Because of the crossover connection of the planet gear sets 26,28 this results in an intermediate speed decrease of the left ring gear 44, a larger speed decrease of the left sun gear 56, and an intermediate speed increase of the right ring gear 48—which increase relative to the planet carrier is slower than that of the right sun gear. When the right ring gear 48 slows down relative to the right output member 72 the teeth 54 draw away from or rotationally separate from the teeth 92. The right sleeve coupling means 80, including teeth 88,90 and 92 as shown, is subsequently urged generally upwardly instead of downwardly when viewing FIG. 4. The helical teeth 90 on the sleeve 86 then come into load-bearing engagement with the helical teeth 64 of the right sun gear 58 such that the reaction urges the right sleeve to the right from the broken line position to the solid line position. Accordingly, the teeth, 88, 90 and 92 are positioned rightwardly as shown by the corresponding reference numbers having a prime indicator appended thereto. Note that the straight teeth 92' of the sleeve are thus axially displaced beyond the position of intermeshing engagement with the internal straight teeth 54 of the right ring gear 48. In this second mode the right ring gear 48 is disengaged from its condition of driving engagement with the output shaft 14, and only about 30% of the total torque to the planet carrier is delivered to the slipping wheel through the right sun gear 58 and teeth 66,76. On the other hand, the teeth 54 of the left ring gear 44 are in positive driving engagement with the teeth 92 of the left sleeve 86 as shown by FIG. 3 so that about 70% of the total torque to the planet carrier is delivered through the helical coupling teeth 88,74 to the left output member 68 and left wheel that has a more positive driving relationship with the ground. The sun gear 56 opposite the disengaged ring gear 48 simultaneously transmits no torque through the straight coupling teeth 66,76.

In general, a relative speed increase of one of the output members 68,72 will cause the sun gear 56,58 on that side of the vehicle to speed up more than the ring gear 44,48 on that side. This results in rotatably retarding the sleeve 86 on that side because of the speed differential, with the result that it is urged out of meshing engagement with the ring gear to an overrunning state. Thus the coupling means 78,80 automatically delivers a preselected ratio more than 50% and less than 100% of the total torque to the slower wheel without internal power dissipation, as is the case with many other prior art differentials having friction clutches, hydraulic pumps, etc. that generate heat. Any preselected ratio in that range can be conveniently established in the instant differential by simply establishing the ratio of the number of ring gear teeth 46 to the number of sun gear teeth 60 proportional to the desired figure. Advantageously, the slower wheel does not have to take 100% of the available torque through the differential 10, so that the components of the drive line to the wheels may be more economically sized. In marked contrast, many other differentials such as the Detroit No. Spin deliver all of the input torque to the slower wheel so that the drive lines must be overdesigned.

SECOND EMBODIMENT

FIGS. 5-14 illustrate a torque proportioning differential 110 constructed in accordance with a second embodiment of the present invention. The differential 110 is of the bevel gear type and includes a driven carrier 112 rotatable about a central axis 114, and preferably three equally circumferentially spaced gear mechanisms or sets of interconnected radially outer and inner pinion gears 116,118 adapted to rotate together about a corresponding number of shafts 120 carried by the carrier normal to the central axis. Each of the outer pinion gears 116 is intermeshingly connected to first and second radially outer bevel gears or large side gears 122,124, while each of the inner pinion gear 118 is intermeshingly connected to first and second radially inner bevel gears or small side gears 126,128. Accordingly, the pinion gears 116,118 serve to cross connect the outer and inner side gears 122 ,128 in a manner somewhat like the planet gear mechanisms described in the first embodiment.

The large side gears 122,124 are each individually connected to a radially outer coupling element 130 through an axially straight tooth connection or slippable spline 132, and the small side gears 126,128 are also each individually connected to a radially inner coupling element 134 through an axially straight tooth connection or slippable spline 136. On each side of the differential 110 the coupling elements 130 and 134 are coupled in a preselected manner to the respective output members 138,140.

More particularly, the construction of the left output member 138 and its relationship to the left coupling elements 130,134 forms a left disengageable coupling means 142 which is a mirror image of a right disengageable coupling means 144 involving the right output member 140 and its relationship to the right coupling elements 130,134 so that a description of one will suffice for the other. In general, the left coupling means 142 includes outer blocker means 146, intermediate cam ring means 148, and inner blocker means 150 as one progresses radially inwardly when viewing FIG. 5. In the second embodiment the cam ring means 148 on each side of the differential 110 individually serve as overrunning clutch mechanisms.

As shown best in FIG. 6, the left outer coupling element 130 and the left output member 138 have defined thereon a plurality of interengaging teeth 152,154 provided with a preselected degree of angular backlash or lost motion between the teeth. The teeth are approximately radial and have a slight back-taper or dovetail shape so that when engaged under torque they exhibit a limited resistance to being disengaged. Referring to FIG. 7, it can be noted that the teeth 154 of the left output member 138 are similarly coupled to a plurality of dovetail shaped teeth 156 integrally formed on the left inner coupling element 134.

The outer blocker means 146 illustrated in FIG. 6 includes a blocking ring or holdout ring 158 that is caused to normally rotate with the output member 138 through a relatively light friction drag load provided by a drag means 159. In the instant embodiment the drag means is a wavy or polygonal metallic strip 160 which is seated in an annular recess 162 formed in the output member and a corresponding recess 164 formed within the blocking ring 158. Thus, the strip is lightly compressed radially between the respective members 138,158 and serves to axially locate the blocking ring on the periphery of the output member. The blocking ring 158 defines therein a plurality of stepped pockets 166 spaced about one side thereof which are adapted to receive a corresponding plurality of stepped projections 168 formed on the outer peripheral surface of the coupling element 130.

Turning now to FIG. 7, the intermediate cam ring means 148 may be noted to include an annular cam ring 170 which is interlockingly associated with the output member 138 on one side and both of the coupling elements 130,134 on the other side. A plurality of rectangular notches 172 are formed at equally spaced intervals radially about the axially inner side surface 174 of the output member, and the cam ring defines thereon a corresponding plurality of axially extending lugs or tabs 176 which are continually received in the notches. As can be seen in the drawing the notches are circumferentially wider than the lugs to provide a preselected degree of angular lost motion therebetween. On the opposite side face of the cam ring a plurality of tapered teeth 178 are formed which make driving engagement with a corresponding plurality of tapered teeth 180,182 formed in the respective coupling elements 130,134.

Figure 5:
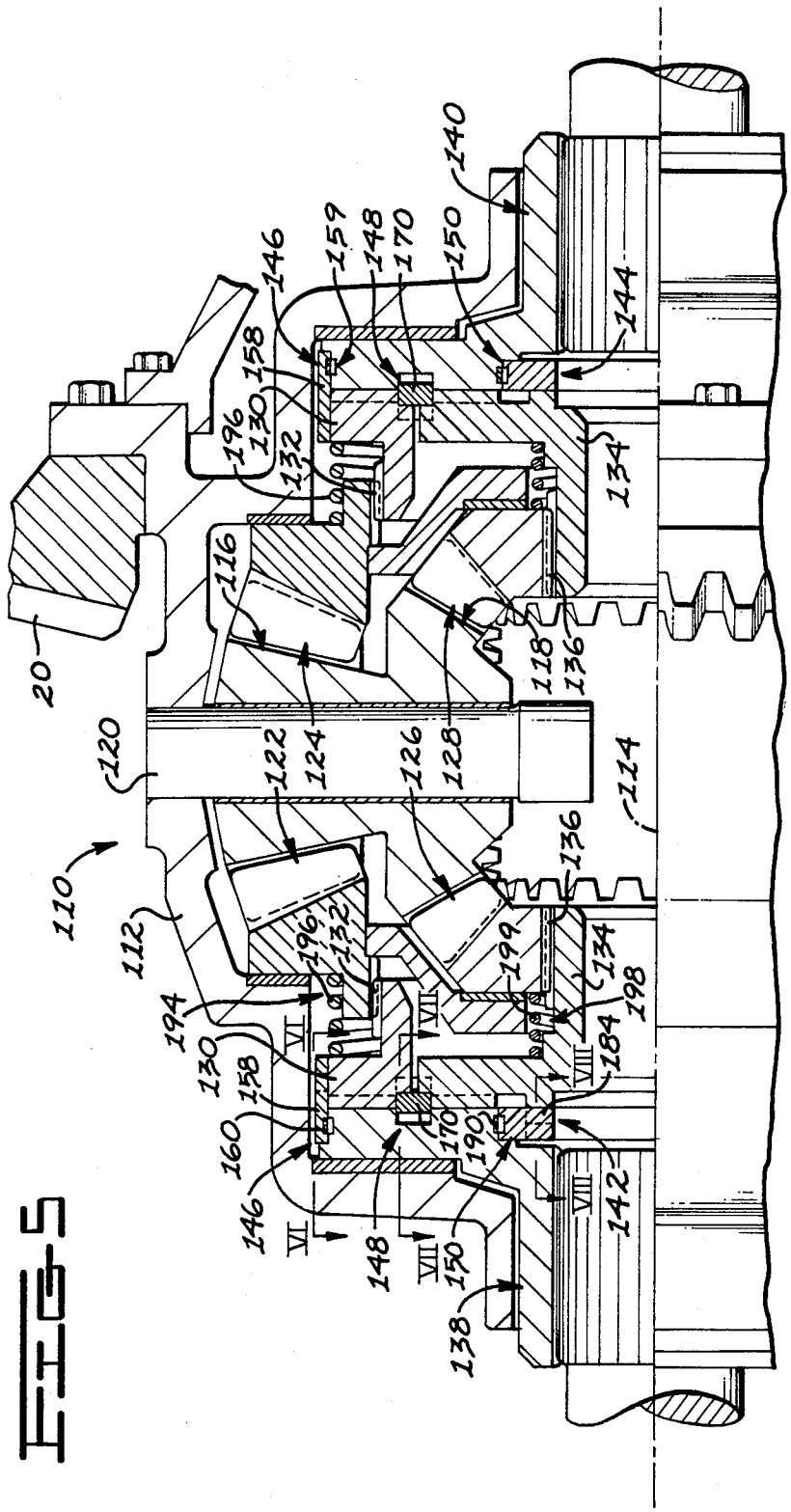
FIG. 5, is a diagrammatic sectionalized view of another embodiment of a torque proportioning differential constructed in accordance with the present invention as taken on only one side of the rotational axis for illustrative convenience.

Referring next to FIG. 8, the inner blocker means 150 can be seen to include a blocking ring or holdout ring 184 which defines therein a plurality of rectangularly stepped pockets 186. Each of these pockets receives a stepped projection 188 of generally corresponding shape which extends axially from the inner coupling element 134. As shown in FIG. 5, the inner blocker means 150 further includes a drag means 190 for providing a relatively light friction drag load between the blocking ring 184 and the output member 138. In the example illustrated the drag means 190 is a wavy metallic strip entrapped in recesses formed in the blocking ring and the output member in a manner substantially like the recesses associated with the radially outer wavy metallic strip 160 discussed heretofore in connection with FIG. 6. Thus, it can be appreciated that the inner blocker means 150 is similar in construction and operation to the outer blocker means 146 in that both prevent reengagement as long as overrunning continues. Furthermore, as shown in FIG. 5, a resilient means 194 continuously urges the outer coupling elements 130 axially away from the centrally located shafts 120 towards their respective output members 138,140. Such resilient means preferably is a coiled compression spring 196 disposed between the respective large side gears 122,124 and the coupling elements 130. A comparable resilient means 198, also illustrated as single compression springs 199, continually urges each of the inner coupling elements 134 axially away from the respective small side gears 126,128.

INDUSTRIAL APPLICABILITY OF SECOND EMBODIMENT

In normal straight-ahead operation of the vehicle, when the carrier 112 is driven in a counterclockwise direction when viewing along the axis 114 from the right side of FIG. 5, the pinion gears 116,118 do not rotate significantly on the respective shafts 121. Also the coupling elements 130,134 are driven in a counterclockwise direction such that they are in driving engagement with their respective output members 138,140.

If the right wheel subsequently turns faster than the left wheel when viewing FIG. 5 then the small side gear 128 on the right turns faster than the large side gear 124 on the right. The torque on the large side gear 124 drops to zero, but torque still remains on the small side gear 128. This torque, acting through right coupling element 134, holds the cam ring 170 in driving engagement against the right output member 140 as shown in FIG. 9 by virtue of the dovetail shaped teeth 156,154 of the coupling element and output member respectively. As the large right side gear 124 lags behind the output member and the cam ring on that side, the right coupling element 130 to which it is splined rides up on the cam teeth 178 as is illustrated in FIG. 10 and moves leftwardly compressing the spring 196 shown in FIG. 5. When the right outer coupling element 130 reaches the position shown in FIG. 11 the teeth 178 of the cam ring are disengaged from the teeth 180 of the coupling element and the right large side gear 124 splined to the coupling element can turn freely at a speed slower than the output member which turns at the speed of the right small side gear 128. Simultaneously, the dovetail teeth 152 of the outer coupling element are progressively retracted from their positions of interlocking engagement with the teeth 154 of the output member as may be noted by comparing FIG. Nos. 12 and 13.

The axial inward movement of the right coupling element 130 produced by the right cam ring means 148 also actuates the right outer blocker means 146. In FIG. 14 the stepped projection 168 of the coupling element is shown partially withdrawn from the stepped pocket 166 of the blocking ring 158, and in FIG. 15 the stepped projection is shown disengaged and rotated slightly to a blocking position. When the cam ring teeth 178 and coupling element teeth 180 are in a position to allow them to reengage the blocking position of the outer blocker means 146 prevents such premature action. The frictional drag means 159 illustrated in FIG. 5 between the blocker ring 158 and the output member 140 allows the blocker ring to be angularly retarded relative to the output member by the small amount necessary to bring the stepped projection into the position illustrated in FIG. 15.

A similar chain of events occurs on the left side of the differential 110 but, in this instance, the speed of the large side gear 122 decreases less than the speed of the small side gear 126. Hence, the left large side gear turns faster than the left small side gear and remains engaged with the left output member 138 through its driving relationship with the left outer coupling element 130. On the other hand, the left inner coupling element 134 is angularly retarded so that the teeth 182 ride up and progressively inwardly away from the cam ring teeth 178, and the left inner coupling element 134 moves rightwardly when viewing FIG. 5 to a disengaged position compressing the spring 199 in the process. Simultaneously, the left inner blocker means 150 is actuated to prevent the cam ring teeth 178 and the coupling element teeth 182 from instantaneous reengagement upon angular alignment thereof.

The result is that when the right wheel of the vehicle slips, not shown, the left output member 138 is supplied with more than half of the total wheel torque and less than full wheel torque as determined by the gear ratio. For example, if the number of teeth on the outer and inner pinion gears 116,118 is established at 11 and 15 respectively, and the number of teeth on the large and small side gears 122,124,126,128 is established at 33 and 18 respectively, then the non-slipping wheel would receive about 70% of the total torque through the engaged large side gear and the slipping wheel would receive about 30% of the total torque through the engaged small side gear.

When steering to the right the greater torque is delivered to the right wheel. This makes the vehicle harder to steer than one with a conventional differential, but not as hard to steer as a vehicle equipped with a differential of the type applying 100% of the torque to the inside wheel.

When the left wheel slips, or when turning to the right, the operation is the same as a turn to the left, except that the large and small side gears 122,124 and 126,128 on each side of the torque proportioning differential 110 exchange roles as the driving and disengaged members. If the vehicle is operated in reverse the situation is generally the same as forward, except for the direction of rotation. Of course, the angular position of the cam rings 170 would instantaneously be reversed relative to the output members such that the lugs 176 of FIG. 7, for example, would abut the opposite sides of the notches 172 in the event that a forward to reverse shift is made or if the torque is reversed such as is often the case with a vehicle going downhill.

After a turn is completed and the vehicle is driven straight ahead, or when one of the wheels is no longer slipping, the respectively disengaged and diagrammatically opposite coupling elements 130,134 will reverse their angular direction relative to their respective output members 138,140. Accordingly, the associated blocker means 146,150 will be realigned to a non-blocking state and the associated resilient means 194 and 198 will subsequently urge the disengaged coupling elements axially outwardly to the engaged positions illustrated in FIG. 5.

From the foregoing it can be appreciated that the torque proportioning differentials 10 and 110 are each capable of positively driving the output members or opposite axles in either direction of rotation of the driven carrier and with each providing, for example, about 70% of the input torque to the slower output member. Advantageously, the faster rotating output member, such as the slipping wheel on ice or the outside wheel on a turn, is provided with about 30% of the input torque. This is achieved without the energy dissipation associated with differentials having friction clutch devices, hydraulic pumps or the like. Moreover, both embodiments are relatively rugged in construction and capable of being conveniently serviced. It is further contemplated that the differentials 10,110 can be employed as inter-axle differentials.

Other aspects, objects and advantages will become apparent from a study of the specification, drawings and appended claims.

I claim:

1. In a torque proportioning differential (10/110) having a driven carrier (18/112) rotatable about a central axis (16/114) and first and second output members (68,72/138,140) extending along the axis (16/114), the improvement comprising:

first and second radially outer gears (44,48/122,124);
first and second radially inner gears (56,58/126,128);
gear means (26,28/116,118) for cross connecting the outer and inner gears (44,48,56,58/122,124,126,128), the gear means (26,28/116,118) being rotatably connected to the carrier (18/112); and
disengageable coupling means (78,80/130,134,142,144) for delivering a preselected ratio more than 50% and less than 100% of the total torque to the first output member (68/138) in response to a relative speed increase of the second output member (72/140) with the remaining torque being delivered thereto, the coupling means (78,80/130,134,142,144) being connected to the output members (68,72/138,140) and at least one of each of the outer gears (44,48/122,124) and the inner gears (56,58/126,128).

2. The differential (10) of claim 1 wherein the outer gears (44,48) have a first plurality of gear teeth (46) and the inner gears (56,58) have a second plurality of gear teeth (60) and the preselected ratio of torque division is the ratio of the first plurality to the second plurality.

3. The differential (10) of claim 1 wherein the outer gears (44,48) are ring gears, the inner gears (56,58) are sun gears, and the gear means (26,28) includes first and second pluralities of interconnected planet gears (30,34).

4. The differential (10) of claim 3 wherein the first plurality of planet gears (30) connects the first outer gear (44) and the second inner gear (58) and the second plurality of planet gears (34) connects the second outer gear (48) and the first inner gear (56).

5. The differential (10) of claim 3 wherein each of the planet gears (30,34) is similar and has a central sleeve portion (40) separating outer gear teeth portions (38).

6. The differential (10) of claim 1 wherein the coupling means (78,80) includes first and second coupling sleeves (86), each sleeve (86) being connected to an individual one of the outer gears (44,48), the inner gears (56,58), and the output members (68,72).

7. The differential (10) of claim 6 wherein each sleeve (86) has tooth means (92) for releasable coupling with one of the outer gears (44,48).

8. The differential (10) of claim 7 wherein the tooth means (92) includes a plurality of straight teeth arranged parallel to the axis (16).

9. The differential (10) of claim 6 wherein each sleeve (86) has tooth means (90) for axially slidingly connecting the respective inner gear (56,58) thereto.

10. The differential (10) of claim 9 wherein the tooth means (90) includes a plurality of two-way, helical coupling teeth.

11. The differential (10) of claim 6 wherein each sleeve (86) has tooth means (88) for axially slidingly connecting the respective output member (68,72) thereto.

12. The differential (10) of claim 11 wherein the tooth means (88) includes a plurality of two-way, helical coupling teeth.

13. The differential (10) of claim 1 wherein the coupling means (78,80) includes first and second sleeves (86), each sleeve (86) having first, second and third coupling teeth (88,90,92) defined thereon.

14. The differential (10) of claim 13 wherein the first coupling teeth (88) are double helical teeth.

15. The differential (10) of claim 13 wherein the second coupling teeth (90) are double helical teeth.

16. The differential (10) of claim 13 wherein the third coupling teeth (92) are straight teeth.

17. The differential (10) of claim 1 wherein the coupling means (78,80) includes first and second sleeves (86), each axially movable between a first position of engagement with its respectively associated radially outer gear (44,48) and a second position of disengagement therewith.

18. The differential (10) of claim 17 including drag means (94) for applying a light rotational retarding force between the sleeves (86) and the carrier (18).

19. The differential (10) of claim 1 wherein the first and second radially outer gears (122,124) are bevel gears.

20. The differential (110) of claim 19 wherein the first and second radially inner gears (126,128) are bevel gears.

21. The differential (110) of claim 20 wherein the gear means (116,118) includes a plurality of sets of interconnected radially outer and inner pinion gears.

22. The differential (110) of claim 21 wherein the coupling means (142,144) includes first and second cam ring means (148) individually connected to the respective output member (138,140), first and second outer coupling elements (130) individually connected to the respective cam ring means (148) and to the outer bevel gears (122,124), and first and second inner coupling elements (134) individually connected to the respective cam ring means (148) and to the inner bevel gears (126,128).

23. The differential (110) of claim 22 wherein the coupling means (142,144) includes outer blocker means (146) for blocking the respective one of the outer coupling elements (130) from reengagement as long as overrunning continues, and inner blocker means (150) for blocking the respective one of the inner coupling elements (134) from reengagement as long as overrunning continues.

24. The differential (110) of claim 1 wherein the disengageable coupling means (130,134,142,144) includes first and second axially movable outer coupling elements (130) individually connected between the respective outer gear (122,124) and the respective output member (138,140).

25. The differential (110) of claim 24 wherein the disengageable coupling means (130,134,142,144) includes first and second axially movable inner coupling elements (134) individually connected between the respective inner gear (126,128) and the respective output member (138,140).

26. The differential (110) of claim 25 wherein each of the coupling elements (130,134) has a plurality of dovetail shaped teeth (152,156), each of the output members (138,140) has a plurality of dovetail shaped teeth (154) adapted to engage the teeth (152,156) of the coupling elements (130,134) with a preselected degree of angular backlash.

27. The differential (110) of claim 26 wherein each of the outer gears (122,124) and inner gears (126,128) is a bevel gear, and the gear means (116,118) include a plurality of interconnected radially outer and inner pinion gear sets.

28. The differential (110) of claim 27 wherein the coupling means (130,134,142,144) includes first and second cam rings (170) individually coupled through a first connection means (178,180) to one of the outer coupling elements (130) and to one of the inner coupling elements (134).

29. The differential (110) of claim 28 wherein the first connection means (178,180) includes a plurality of tapered teeth on each of the cam rings (170) and the coupling elements (130,134).

30. The differential (110) of claim 29 wherein each of the cam rings (170) is coupled to a respective one of the output members (138,140) through a lug (176) and a notch (172) construction with a preselected degree of angular backlash therebetween.

31. In a torque proportioning differential (10) having a driven carrier (18) rotatable about a central axis (16) and left and right output members (68,72) extending along the axis (16), the improvement comprising:
  left and right ring gears (44,68);
  left and right sun gears (56,58);
  left and right compound planet gear sets (26,28) cross connected between the ring gears (44,48) and the sun gears (56,58), the planet gear sets (26,28) being rotatably mounted on the carrier (18); and
  left and right sleeve coupling means (78,80) for connecting the respective ring gear (44,48) and sun gear (56,58) to the respective output member (68,72) and being disengageable for delivering a preselected ratio more than 50% and less than 100% of the total input torque to the slower rotating output member (68,72).

32. The differential (10) of claim 31 wherein each sleeve coupling means (78,80) includes a sleeve (86) having first, second and third coupling teeth (88,90,92) defined thereon.

33. The differential (10) of claim 32 wherein the first and second coupling teeth (88,90) are double helical teeth, and the third coupling teeth (92) are straight teeth.

34. The differential (10) of claim 32 wherein each of the sleeves (86) is axially movable between a position of engagement with its respectively associated ring gear (44,48) and a second position of disengagement therewith.

35. The differential (10) of claim 34 including drag means (94) for applying a rotational retarding force between the sleeves (86) and the carrier (18).

36. The differential (10) of claim 35 wherein the sun gears (56,58) are connected to the respective output members (68,72) through a tooth connection (66,76) having a preselected degree of angular backlash.

37. In a torque proportioning differential (110) having a driven carrier (112) rotatable about a central axis (114) and left and right output members (138,140) extending along the axis (114), the improvement comprising:
left and right outer bevel gears (122,124);
left and right inner bevel gears (126,128);
a plurality of sets of interconnected radially outer and inner pinion gears (116,118) cross connecting the outer and inner bevel gears (122,124,126,128) and being rotatably mounted on the carrier (112); and
left and right coupling means (130,134,142,144) for connecting the respective outer and inner bevel gear (122,124,126,128) to the respective output member (138,140) and being disengageable for delivering a preselected ratio more than 50% and less than 100% of the total input torque to the slower rotating output member (138,140).

38. The differential (110) of claim 37 wherein each of the left and right coupling means (130,134,142,144) includes an outer coupling element (130) axially slideably connected to the respective outer bevel gear (122,124) and an inner coupling element (134) axially slideably connected to their respective inner bevel gear (126,128).

39. The differential (110) of claim 38 wherein each of the left and right coupling means (130,134,142,144) includes cam ring means (148) for urging one of the outer and inner coupling elements (130,134) out of driving engagement with the respective output member (138,140) when its rotational speed is retarded relative thereto.

40. The differential (110) of claim 39 including left and right blocker means (146) for blocking the respective one of the outer and inner coupling elements (130,134) from reengagement as long as overrunning continues.

* * * * *